United States Patent [19]
Lowenstein et al.

[11] 3,983,212
[45] Sept. 28, 1976

[54] ALUMINA PRODUCTION

[76] Inventors: Hyman Moses Lowenstein; Arthur Michael Lowenstein, both of 1 Hearn Drive, Northcliff, Johannesburg, Transvaal, South Africa

[22] Filed: Aug. 29, 1974

[21] Appl. No.: 501,788

[30] Foreign Application Priority Data
Aug. 31, 1973 South Africa.................... 73/5996

[52] U.S. Cl.............................. 423/137; 423/111; 423/119; 423/127; 423/556; 423/626; 423/630; 423/128
[51] Int. Cl.$^2$.......................................... C01F 7/26
[58] Field of Search ........... 423/111, 132, 137, 128, 423/127, 556, 119

[56] References Cited
UNITED STATES PATENTS

| | | | |
|---|---|---|---|
| 1,137,617 | 4/1915 | Hershman............................ | 423/137 |
| 1,457,787 | 6/1923 | Moldenke............................ | 423/132 |
| 2,120,840 | 6/1938 | McCullough........................ | 423/132 |
| 2,350,575 | 6/1944 | Tomlinson et al................... | 423/132 |
| 2,551,944 | 5/1951 | Haff..................................... | 423/128 |

*Primary Examiner*—Herbert T. Carter

[57] ABSTRACT

A method of producing an alumina bearing product in which the alumina is substantially soluble in cold alkali including the steps of contacting an aluminium bearing material with concentrated sulphuric acid containing 30 to 100 weight percent sulphuric acid, heat treating the acid and material to cause the acid to react with the material to form a substantially anhydrous hard product and decomposing the product by heat treatment to produce the alumina bearing product. The alumina values may be recovered from the resulting alumina bearing product using the known Bayer process. The process has particular application to non-bauxitic ores.

6 Claims, 1 Drawing Figure

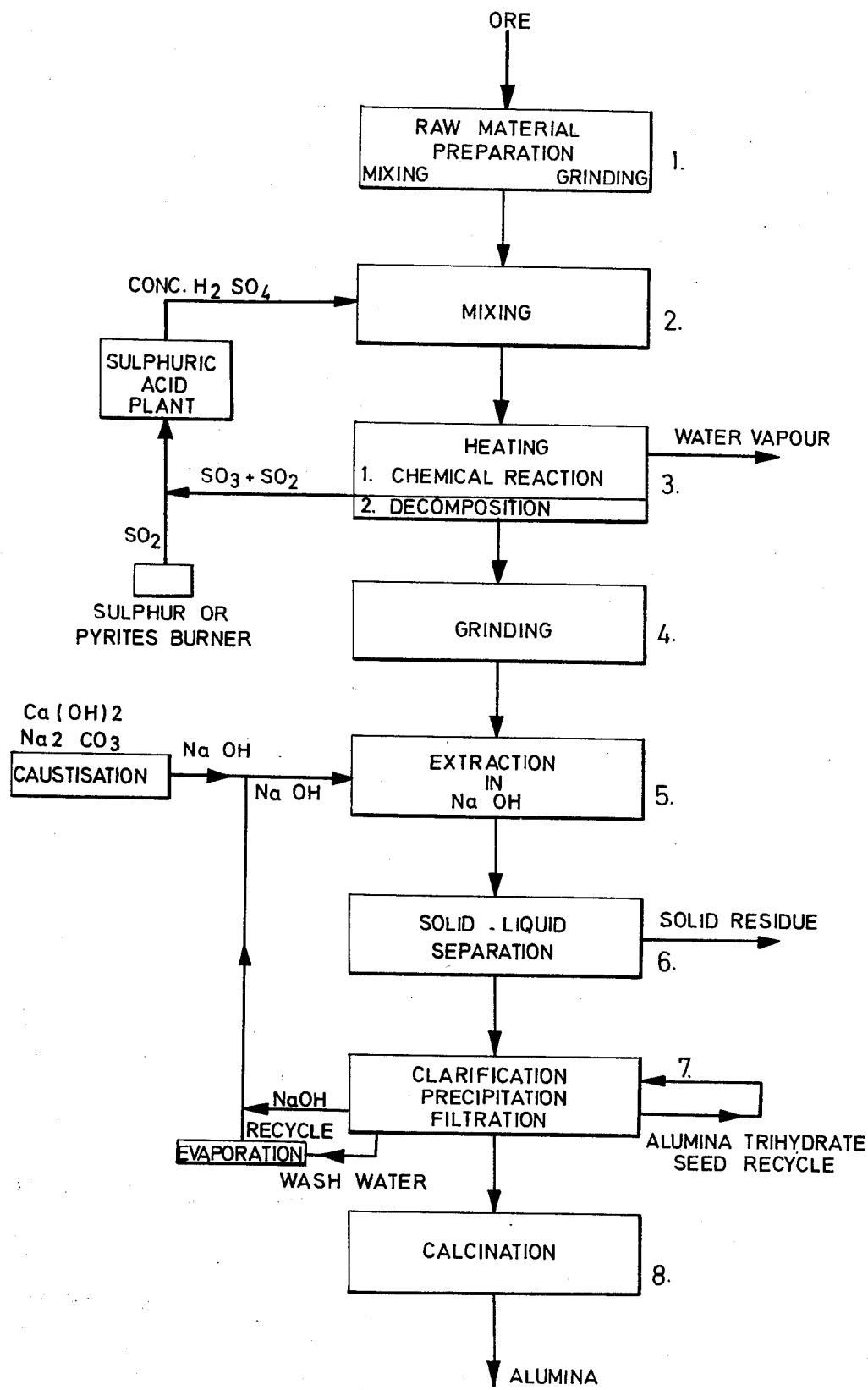

ALUMINA PRODUCTION

This invention relates to alumina production.

Alumina is found in many naturally occurring materials around the world. The most important material containing alumina is bauxite as it is from this material that alumina is most readily extracted. As far as the Applicants are aware no economic method has been devised for extracting alumina from other alumina bearing materials such as clays, e.g. kaolinite, montmorillonite and flint clay, waste products such as coal ash and aluminium silicate ores, e.g. kyanite and andalusite.

Alumina is recovered from bauxite in a commerical manner by using the Bayer process. Briefly, the Bayer process involves grinding the raw material, digesting the ground material in sodium hydroxide at elevated temperatures, thereby forming sodium aluminate, separating the bauxite residue from the solium aluminate solution by sedimentation and filtration, precipitating alumina trihydrate from the sodium aluminate liquor and calcining the alumina trihydrate to produce alumina. This process is unsuitable for extracting alumina from any material other than bauxite.

Cetrain processes such as the nitric acid process, the hydrochloric acid-isopropyl ether process and the sulphurous acid process have been suggested for extracting alumina from clays, but these processes have not proved economically viable.

According to the present invention, there is provided a method of producing an alumina bearing product including the steps of contacting on aluminium bearing material with concentrated sulphuric acid, heat treating the material and acid to cause the acid to react with the material to form a substantially anhydrous, hard product and decomposing the product by heat treatment to produce an alumina bearing product. Preferably, the material is finely ground and mixed with the sulphuric acid.

Depending on the type of aluminium bearing material, the resulting mixture will be a heavy liquid slurry or a thick heavy plastic mass and is thus in an easily manageable form for the heat treatment. Furthermore, the use of concentrated sulphuric acid means that the mixture is relatively non-corrosive.

Concentrated sulphuric acid, as used in this specification, means acid containing from 80 to 100 weight percent sulphuric acid, the balance being water.

The temperature of heat treatment of acid and material will vary with the type of material being treated. However, it has been found that for most aluminium bearing materials e.g. ores a temperature above about 190° and below the boiling point of the acid is desirable to achieve completion of the chemical reaction and elimination of the water. The boiling point of concentrated sulphuric acid at 760mm Hg pressure is about 340°C.

The heat treatment of the acid and material is preferably effected by first heating the acid and material to a temperature of about 190°C followed by further heating at a temperature above 190°C, but below the boiling point of acid, to produce the substantially anhydrous hard product.

The anhydrous, hard product of the first heat treatment is subjected to further heat treatment in which the chemical reaction product of the acid and material is decomposed to produce an alumina bearing product in which substantially all the alumina is soluble in alkali at ambient temperature. The temperature of this heat treatment is preferably in the range of about 700°C to about 800°C. The heat treatment may be carried out in the presence of a reducing agent such as a carbonaceous reducing agent. The presence of the reducing agent has been found to lower the decomposition temperature. Heat treatment may also, if desired, take place under vacuum conditions.

It is to be noted that the second heat treatment can follow the first heat treatment without any separation of the intermediate substantially anhydrous, hard product.

The resulting alumina bearing product is in a form in which the alumina values are alkali soluble and can readily be extracted by, for example, dissolving the product in alkali solution, separating off undissolved solids and precipitating a hydrated form of aluminum from the solution. This is so even for many non-bauxitic ores which is particularly surprising.

The alumina bearing material may be any of the following materials :

1. Clay minerals such as Kaolinite, Halloysite, Montmorillonite, Beidellite, Pyrophyllite, China Clay, Flint Clay, Kaolin, Fuller's-Earth.
2. Hydrated oxides of aluminum such as Bauxite, Gibbsite, Diaspore.
3. Other aluminium silicate ores such as shales, schists and feldspars.

The invention will further be described with reference to the accompanying flow diagram.

Referring to the flow diagram, an aluminium bearing ore is treated in the following manner :

1. The ore is crushed and ground.
2. The ground ore is mixed with concentrated sulphuric acid.

The quantity of sulphuric acid used and the concentration is determined by the composition and the characteristics of the ore treated. For optimum extraction of the alumina the quantity may vary from 50% to 120% of the stoichiometric or theoretical sulphuric acid required to react with the alumina present in the ore.

Various types of liquid solid mixers can be used, the type chosen will depend on the characteristics of the ore. It has been found that some clays form a thick heavy plastic mass with the required quantity of sulphuric acid, whereas others form a heavy liquid slurry. The mixing stage 2 may be combined into a dual operation in the first part of the next stage.

3. The mixture of mineral and concentrated sulphuric acid is next subjected to heat treatment in two stages to produce an alumina bearing product in which substantially all the alumina is soluble in alkali, e.g. sodium hydroxide, under ambient conditions.

In the first stage the sulphuric acid reacts with the ore to form aluminium sulphate and other sulphates depending on the impurities in the ore. Water is also formed in the reaction. This water as well as water originally combined in the ore is driven off in the form of water vapour or steam. The product resulting from the reaction is a dry hard solid.

The type of oven used to heat the sulphuric acid ore mixture is chosen according to whether the mixture is a thick plastic mass or a liquid slurry. If the mixture is a plastic mass it can be extruded in a Pug Mill, as used in the Brickmaking or Ceramic Industries. The plastic mass can be extruded into briquets, rods, pellets or any other suitable shapes. These are then fed into an oven or kiln, which can be of a continuous or batch type for example a heated tunnel. Alternatively the plastic mass can be pelletised in a suitable pelletising machine or pressed into shapes or pieces by a press. These can then be fed into an oven.

Where the mixture forms a thick liquid slurry it may be heated in other ways such as for example by being fed into a large rotating cylinder or tube containing rods or balls which crush the hard product formed in the chemical reaction. The tube or cylinder which is somewhat similar to a Rod Mill, Ball Mill or Tube Mill is heated to the desired temperature by heating the shell directly, or by having the shell jacketed and passing a heated fluid through the jacket.

Alterntively the reaction vessel can be heated by passing combusion gases from gas or oil burners into it. Another method of heating the mixture of acid and ore is to feed the slurry on to the outside surface of a heated rotating drum or drums, the drums being heated on the inside by means of a hot circulating fluid. A further method is to spray the slurry into an oven kept at the correct temperature with suitable arrangement for removing the reaction product. Other known methods of heating the acid ore mixture are available. The above are only some methods that can be used.

The temperature to which the mixture is heated in the first stage is also dependent on the ore treated. Some ores react at temperatures as low as 160°C and some at temperatures above 250°C. In practice it has been found that most ores can be heated to a temperature between 190°C to 300°C for completion of the chemical reaction and elimination of all water.

During the first stage heating process the water produced is removed and exhausted from the oven or heating apparatus or drying plant. There is no reason why the first stage of heating should not be carried out at higher temperatures than 250°C. The heating can even be done up to 500°C or 600°C in the first stage. The maximum temperature is determined by the temperature at which decomposition of the sulphates commence.

The anhydrous, hard product contains the chemical reaction product of the material and the acid.

To produce an alumina bearing product, the product from the first heating stage is then heated at a higher temperature in order to decompose the aluminum sulphate, iron sulphate and other sulphates which were produced during the chemical reaction in the first heating stage. This decomposition is accomplished by heating the product in a furnace or kiln to a suitable temperature at which the sulphates break down into alumina and other metal oxides with the production of sulphur trioxide and sulphur dioxide ($SO_3$ and $SO_2$) gases.

The gases are removed from the furnace or kiln and passed to a plant where they are reconstituted or manufactured into sulphuric acid (concentrated), which is reused to react with further supplies of ore. Losses of sulphuric acid in the process are made good by burning sulphur or pyrites to sulphur dioxide. Alternatively fresh sulphuric acid can be added to compensate for losses.

To avoid substantial amounts of $\alpha$-alumina being produced too high a temperature should be avoided. The preferred conditiions for many ores are in the range of 700°C to 800°C.

It has been found that decomposition temperatures can be lowered by heat treating in the presence of reducing agents such as carbon or carabonaceous products such as coal dust, charcoal or coke. Other suitable reducing agents are sulphur, metallic sulphides and metallic oxides. The reducing agent may be added to the ground product from the first heating stage before being fed to stage 2.

Heating the sulphuric acid ore mixture in two stages keeps the steam produced in stage 1 separated from the sulphur trioxide and sulphur dioxide gases produced in heating stage 2. However, the heating processes can be carried out in a single continuous furnace provided that provision is made for keeping the steam and gaseous decomposition products separated by having two exhausting systems and a suitable partition or partitions in the furnace. This method would be especially applicable where the ore can be formed into pellets or briquets as mentioned above.

The alumina in the resulting solid product is in a form in which it can readily be extracted using conventional techniques, e.g. the Bayer process using cold or hot alkali. In particular, it has surprisingly been found that this is so even when starting with non-bauxitic ores.

4. The product resulting from 3 is ground to a suitable powder.

5. The ground product from stage 4 is agitated with sodium hydroxide solution, in tanks to dissolve the alumina as sodium aluminate. The sodium hydroxide solution which is agitated with the milled product is used either cold, warmed, or at boiling point preferably at atmospheric pressure. The optimum temperature required has been found to be different for the various minerals extracted and must be determined for each raw material. It has not been found necessaray to use higher temperatures than boiling point and it has also not been necessary to extract the alumina at pressures above atmospheric. It is a surprising aspect of the process that a product is produced which contains alumina soluble in cold sodium hydroxide solution.

The extraction process can be carried out as a batch process or as a continuous countercurrent process.

6. After solution of the alumina, the sodium aluminate solution is separated from the undissolved silica, iron hydroxide, and other insoluble impurities by filtration, settling and decantation, or centrifugal separation. The solid residue is well washed and the wash waters evaporated to concentrate residual sodium hydroxide for reuse.

7. The solution is clarified and alumina trihydrate precipiated by adding alumina trihydrate seed from previous precipitations. This is the well known Bayer Process.

The precipitated alumina trihydrate is divided into two fractions, one fraction is kept and recycled for seeding further sodium aluminate solution and the other fraction is filtered and alumina trihydrate recovered after washing well with water. The filtrate is recycled to stage 5 to dissolve further alumina. The wash water is concentrated by evaporation and returned to the recycled filtrate.

8. The recovered alumina trihydrate is calcined to form anhydrous alumina.

Instead of precipitating the alumina in stage 7 with trihydrate seed, carbon dioxide gas can be used as an alternative. This precipitates aluminium hydroxide and converts sodium aluminate into sodium carbonate. The sodium carbonate can then be converted into sodium hydroxide with calcium hydroxide.

The invention will now be illustrated by the following examples.

EXAMPLE 1

PRODUCTION OF ALUMINA FROM KAOLIN 1. 100 gms of finely ground Kaolin with an alumina content of 28% mixed with 100 gms of concentrated sulphuric acid (concentration 98% $H_2SO_4$) to form a thick plastic paste. The paste was extruded into pellets approximately 1.25 cms long by 0.5 cm in diameter by means of a hand operated type extruder.
2. The pellets were heated in a electric oven to a temperature of 200°C for 30 minutes and the temperature then raised to 300°C for a further 2½ hours. At 200°C reaction between the Kaolin and te sulphuric acid took place with the expulsion of steam and the pellets were transformed into hard rock like small cylinders.
3. The product from stage 2 was allowed to cool, crushed and ground to −200 mesh. It was then well mixed with 10 gms of finely ground coal (−200 mesh) and heated in an electric furnace to a temperature of 775°C for 30 minutes. The $SO_2$ and $SO_3$ gases which formed from the decomposition of the sulphates were removed by means of a small fan. The above treatment converted the alumina into alkali soluble alumina.
4. After cooling to room temperature the product from 3 was dissolved in 500 ml of caustic soda solution, the concentration of sodium hydroxide in the solution being 70 gms per litre. The mixture of treated clay and solution was agitated for ten minutes and then filtered on a Buchner filter, under suction. The residual cake was washed several times with small quantities of water. The undissolved residue was discarded.
5. Carbon dioxide gas was passed into the clear solution from stage 4 until all the alumina had precipitated as aluminium hydroxide. This was then separated by filteration on a Buchner filter and well washed. The aluminium hydroxide was then dried in a drying oven at 105°C. The filtrate was heated with calcium oxide to recover caustic soda for reuse.
6. The dried aluminium hydroxide was heated to 1000°C in an electric furnace to produce substantially pure anhydrous alumina.

The $SO_2$ and $SO_3$ gas produced from the decomposition of sulphates may be reconverted into sulphuric acid by the well known standard process for producing sulphuric acid.

EXAMPLE 2

1. 100 gms of Flint clay containing 38% alumina ($Al_2O_3$) was mixed with 114 gms of concentrated sulphuric acid and the mixture heated in an electric oven at 200°C for 30 minutes. The temperature was then raised to 300°C for a further 2½ hours.
2. The product from 1 above was placed in an air tight electric furnace and heated to 775°C under vacuum (−22 inches Hg) for 30 minutes. $SO_3$ gas formed from the decomposition of the sulphates, was reformed into 98% sulphuric acid with the addition of water.

The alumina in the material remaining in the furnace was then alkali soluble.
3. The cooled solid residue from 2 was ground to a fine powder and dissolved in 400 ml of ambient temperature caustic soda solution (100 gms/l) by agitating gently for ten minutes. The undissolved residue was separated by filtration on a Buchner filter, the residue being well washed with small quantities of water.
4. The filtrate from 3 was seeded with aluminium trihydrate and agitated to produce caustic soda and aluminium trihydrate.
5. The precipitated aluminium trihydrate was filtered off, well washed and dried at 105°C.
6. The dried product from 5 was heated at 1000°C to produce substantially pure anhydrous alumina.

EXAMPLE 3

1. 100 gms of finely ground Refactory clay containing 38% of alumina was mixed with 15 gms of coal dust and 114 gms of concentrated sulphuric acid (98%).
2. The mixture was heated to 200°C for 30 minutes and then at 300°C for a further 2½ hours in an electric oven.
3. The solid product from 2 was heated to 775°C for ½ an hour, the decomposition products $SO_2$ and $SO_3$ gases were removed from the furnace by means of a small fan.
4. The product from 3 was cooled, ground to a fine powder and extracted with caustic soda solution. The sodium aluminate solution was separated from the residual silica and other insolubles by filtration.
5. The sodium aluminate solution was seeded with aluminium trihydrate and the alumina recovered from the sodium aaluminate solution. The aluminium trihydrate was recovered by filtration, washed and dried at 105°C.
6. The aluminium trihydrate was calcined at 1200°C to produce substantially pure, anhydrous alumina.

We claim:
1. A method of producing a product containing alkali soluble alumina consisting essentially of the steps of contacting an aluminum silicate material selected from the group consisting of clay minerals, coal ash and aluminum silicate ores with concentrated sulphuric acid containing 80 to 100 weight percent sulphuric acid, heating the aluminum silicate material and the acid to a temperature above 190°C and below the boiling point of the acid to produce a substantially anhydrous hard product containing aluminum sulfate and silica and decomposing the hard product by heat treatment at a decomposing temperature below 800°C. in the presence of a reducing agent to produce a product containing alkali soluble alumina.
2. A method according to claim 1 wherein the aluminium silicate material is finely ground and mixed with the concentrated sulphuric acid.
3. A method according to claim 1 wherein the acid and aluminum silicate material are first heated to a temperature of about 190°C followed by further heat treatment at a temperature above 190°C and below the boiling point of the acid to produce the substantially anhydrous hard product.
4. A method according to claim 1 wherein the temperature of heat treatment of the anhydrous, hard product containing aluminium sulfate is in the range of about 700°C to about 800°C.
5. A method according to claim 3 wherein the temperature of heat treatment of the anhydrous, hard product containing aluminum sulfate is in the range of about 700°C to about 800°C.
6. A method according to claim 1 wherein the reducing agent is a carbonaceous reducing agent.

* * * * *